Patented Oct. 26, 1954

2,692,868

UNITED STATES PATENT OFFICE 2,692,868

PROCESS FOR PREPARING SILICA-CONTAINING POLYMERIC COMPOSITIONS WITH PEROXYSILICA CATALYST

Kenneth L. Berry, Hockessin, and Paul L. Salzberg, Wilmington, Del., assignors to E. I. du Pont de Nemours & Company, Wilmington, Del., a corporation of Delaware No Drawing. Application November 9, 1951, Serial No. 255,744

5 Claims. (Cl. 260—41)

This invention relates to new compositions of matter and more particularly to new polymeric materials and to methods for obtaining them.

It is an object of this invention to provide new polymeric compositions and methods for their preparation. A further object is to provide new polymers containing silica and methods for their preparation. Other objects will appear hereinafter.

These objects are accomplished by the following invention of polymeric compositions comprising silica and a polymer of a polymerizable monoethylenically unsaturated compound containing a single ethylenic double bond as the sole aliphatic carbon-to-carbon unsaturation, the silica to polymer weight ratio in said polymeric composition being from 99.9:0.1 to 75:25 and the polymer being attached chemically to the silica through covalent ester linkages.

It has now been found that peroxysilicas are capable of catalyzing the addition polymerization of polymerizable monoethylenically unsaturated compounds and most unexpectedly that the resulting silicas contain chemically bound polymers attached to the silica surfaces. This invention accordingly provides new polymer-containing silicas in which the silica: polymerized monoethylenically unsaturated compound weight ratio is from 99.9:0.1 to 75:25, in which silica is chemically bound to the polymer through covalent ester linkages, and in which the degree of esterification is less than one. By degree of esterification as used herein is meant the average number of polymer molecules attached per square millimicron of specific surface area of the silica.

In a practical and preferred method for obtaining the silica-polymer compositions of this invention, there is added to silica 90% hydrogen peroxide in amount sufficient to wet completely the silica and the mixture vacuum distilled at room temperature to remove water and excess hydrogen peroxide. To the dried product there is then added the polymerizable monoethylenically unsaturated compound in amount sufficient to provide a weight ratio of peroxysilica to monomer of from 1:3 to 0.10:9.9 and the mixture maintained at 40° to 150° C. until polymerization occurs. Thereafter the product is extracted with a solvent for the monomer and polymer and the extracted silica-polymer composition dried.

The examples which follow are submitted to illustrate and not to limit this invention. Parts are by weight unless otherwise specified.

Example I

One part of a finely divided silica having a specific surface area of approximately 300 sq. meters/g. was dried by heating one-half hour at 600° C. and cooled under nitrogen. The silica was placed in 2 parts of 90% hydrogen peroxide and then dried to apparent dryness by vacuum treatment at room temperature. Final vacuum treatment was 3 hours at $10^{-3}$ mm. with the peroxysilica at 25–45° C. This product contained peroxide equivalent to 0.21% hydrogen peroxide by iodometric assay.

One part of this peroxysilica was placed in 10 parts of freshly distilled styrene in an evacuated vessel which was then heated 1.5 hours at 100° C. The mixture was extracted continuously for 50 hours with sodium-dried benzene and polymer recovered from the benzene solution by steam distillation. It was found that the extracted product contained 17% carbon which indicated that it comprised 18.5% polystyrene attached to the silica. Since 1 part of polystyrene was recovered from the extract, the total conversion of styrene to polymer was 12.3% of which 18.7% was chemically combined with the silica.

A portion of this silica-polymer composition was boiled 2 hours in dilute hydrochloric acid (about 0.1 N) and then extracted with benzene continuously for 24 hours. The carbon content of the composition decreased from 17% to 0.8% indicating that the polymer had been attached to the silica by silicate ester linkages which hydrolyzed releasing the polymer which was then extracted.

A mixture of 1 part of the polystyrene which formed apart from the silica, 1 part of the silica in its original condition and 10 parts of benzene as solvent for the polystyrene was heated under the conditions employed for the polymerization, namely, 1.5 hours at 100° C. The silica was extracted with benzene and found to contain only 0.6% carbon. This indicated that the silica-polymer composition did not result from any reaction of the polymer, after its formation, with the silica.

Example II

One part of silica having a specific surface area of 329 m.²/g. was mixed with 2 parts of 90% hydrogen peroxide. The mixture was subjected to vacuum until the silica reached apparent dryness. This peroxysilica was stored 14 days exposed to the atmosphere after which it contained 1.6% hydrogen peroxide equivalent and 40% moisture.

Three parts of this peroxysilica and 14 parts of methyl methacrylate contained in an evacuated vessel were heated 12 hours at 60° C. The resulting mixture was continuously extracted 48 hours with sodium-dried benzene. The extracted silica product contained 11.3% combined polymethyl methacrylate according to carbon analysis and 2.29 parts of polymethyl methacrylate was extracted by the benzene.

A portion of the silica-polymer composition was hydrolyzed by boiling 1 hour in approximately 0.1 N hydrochloric acid solution. The silica was extracted continuously for 18 hours with sodium-dried benzene after which it contained only 0.6% carbon. This indicated that the polymethyl methacrylate which was recovered from the extract had been attached to the silica by hydrolyzable silicate ester linkages.

*Example III*

One part of the silica of Example II was mixed with 2.5 parts of 90% hydrogen peroxide. The silica was filtered off and dried on the filter by passing a nitrogen stream over it for five days followed by 2 hours evacuation at $10^{-3}$ mm. The peroxysilica contained 3.2% hydrogen peroxide equivalent. After 5 hours at room temperature the hydrogen peroxide equivalent of the peroxysilica had decreased to 0.33%, and after 22 hours to 0.02%.

At a time when its hydrogen peroxide equivalent was approximately 0.5%, this peroxysilica, 3 parts, was mixed with 9 parts of acrylonitrile and heated 4.5 hours at 60° C. in an evacuated vessel. The acrylonitrile was essentially completely converted to polymer. The product was extracted continuously for 115 hours with refluxing dimethylformamide. Carbon and nitrogen analysis of the extracted material indicated that it comprised 5% polyacrylonitrile combined with the silica.

A convenient method for preparing the peroxysilicas used as catalysts in preparing the products of this invention is that described in Chem. Zeit. 38, 121–2 (1914). It is therein described that when silica gel is mixed with 30% hydrogen peroxide and the mixture then dried, there is obtained a white powder which is characterized by giving peroxide reactions. A similar product is obtained by slow evaporation over concentrated sulfuric acid of a mixture of a silicic acid hydrogel and hydrogen peroxide. It is also known (Chem. Zeit. 48, 310 (1924)) that the product obtained by treating sodium silicate hexahydrate with 82% hydrogen peroxide gives typical peroxide reactions and corresponds in composition to between $Na_2SiO_4 \cdot 3H_2O \cdot H_2O_2$ and $$Na_2SiO_3 \cdot 3H_2O \cdot 2H_2O_2$$

Other methods known to those skilled in the art may also be used, for example, the silanol surface groups of silica can be reacted with thionyl chloride and then with hydrogen peroxide or sodium peroxide.

The polymer-containing silicas of this invention are conveniently made by the bulk polymerization technique. If desired, however, they may be made in the presence of non-hydroxylated solvents but this has no practical advantage and only adds to costs.

The exact conditions for preparing the products of this invention depend upon the nature of the polymerizable monomer. If the monomer is normally a liquid, the products may be made in open reactors fitted with means for keeping the monomer from being lost through volatilization. If the monomer is normally a gas, then a closed reactor is employed and the reaction is conducted under autogenous pressure. If desired, however, externally applied pressure can be used to accelerate the reaction, bring about more complete utilization of monomer, or effect some other beneficial result.

Generally the polymerization is conducted at temperatures in the range of 40 to 150° C. However, since the best results from the standpoint of polymer quality, reaction rate, and monomer utilization are obtained within the range of 60 to 100° C., this embraces the preferred operating temperature range.

The time of reaction is a variable function and depends upon the nature of the monomer being polymerized, temperature and pressure conditions employed, etc. As a rule, the polymerization is carried on until there has been appreciable utilization of monomer.

The monomers usefully employable in preparing the products of this invention are the polymerizable organic compounds which have one ethylenic double bond as the sole aliphatic carbon-carbon unsaturation and which are recognized as being capable of undergoing addition polymerization across the ethylenic double bond in the presence of a compound capable of yielding reactive free radicals under the conditions of reaction. Examples of such compounds are ethylene, propylene, and the butylenes, vinyl fluoride, vinylidene fluoride, trifluoroethylene, tetrafluoroethylene, vinyl chloride, vinylidene chloride, vinyl acetate, vinyl trimethylacetate, vinyl methyl ketone, vinyl propyl ketone, styrene, acrylo- and methacrylonitriles, acrylic and methacrylic acid esters, e. g., methyl acrylate, ethyl methacrylate, cyclohexyl acrylate, bornyl methacrylate, allyl acrylate, etc., acryl- and methacrylamides, diallyl succinate, diallyl phthalate, maleic and fumaric esters, e. g., methyl hydrogen maleate, dimethyl maleate, diethyl fumarate, etc., maleic anhydride, etc. Combinations of two or more of the above polymerizable monomers may be used if desired.

The products of this invention are translucent to opaque materials which find utility per se in the fabrication of molded objects or as compounding agents in other polymeric materials to impart new and unique properties of hardness, toughness, etc., to such products. For example, the products are useful as fillers and reenforcing agents for polymeric materials and in this application they can be used in proportions to yield products having ultimate silica contents of from 1 to 50% by weight. The most useful products have a degree of polymerization which is at least 25 in the organic constituent.

As many apparently widely different embodiments of this invention may be made without departing from the spirit and scope thereof, it is to be understood that this invention is not limited to the specific embodiments thereof except as defined in the appended claims.

We claim:

1. A process for the preparation of silica-containing polymeric compositions which comprises heating and polymerizing at a temperature of 40° to 150° C. a polymerizable monoethylenically unsaturated monomer containing a single ethylenic double bond as the sole aliphatic carbon-to-carbon unsaturation in admixture with dried peroxysilica as the sole polymerization catalyst, the weight ratio of said peroxysilica to said polymerizable monoethylenically unsaturated monomer being 1:3 to 0.10:9.9.

2. A process for the preparation of silica-containing polymeric compositions as set forth in claim 1 in which the heating and polymerizing is at a temperature of 60° to 100° C.

3. A process for the preparation of silica-containing polymeric compositions which comprises heating and polymerizing at a temperature of 40° to 150° C., styrene in admixture with dried peroxysilica as the sole polymerization catalyst, the weight ratio of said peroxysilica to said styrene being 1:3 to 0.10:9.9.

4. A process for the preparation of silica-containing polymeric compositions which comprises heating and polymerizing at a temperature of 40° to 150° C., methyl methacrylate in admixture with dried peroxysilica as the sole polymerization catalyst, the weight ratio of said peroxysilica to said methyl methacrylate being 1:3 to 0.10:9.9.

5. A process for the preparation of silica-containing polymeric compositions which comprises heating and polymerizing at a temperature of 40° to 150° C., acrylonitrile in admixture with dried peroxysilica as the sole polymerization catalyst, the weight ratio of said peroxysilica to said acrylonitrile being 1:3 to 0.10:9.9.

References Cited in the file of this patent

UNITED STATES PATENTS

| Number | Name | Date |
|---|---|---|
| 2,394,642 | Strain et al. | Feb. 12, 1946 |
| 2,438,520 | Robie et al. | Mar. 30, 1948 |
| 2,467,339 | Seymour | Apr. 12, 1949 |
| 2,467,341 | Seymour | Apr. 12, 1949 |
| 2,657,149 | Iler | Oct. 27, 1953 |

OTHER REFERENCES

Komarovskii: Chem. Ztg., vol. 38, pp. 121–2 or Chem. Abstracts, vol. 8, p. 1715, 1914.